United States Patent Office 3,733,284
Patented May 15, 1973

3,733,284
CELLULAR RUBBER OF 1,2-POLYBUTADIENE
Eiichiro Shiratsuchi, Yokkaichi, Satoshi Terashima, Matsugae-machi, and Mitsuo Ichikawa, Yokkaichi, Japan, assignors to Japan Synthetic Rubber Co., Ltd., Tokyo, Japan
No Drawing. Filed June 10, 1970, Ser. No. 45,224
Claims priority, application Japan, June 25, 1968, 43/43,623
Int. Cl. C08d *13/10, 5/00*
U.S. Cl. 260—2.5 H                                         2 Claims

ABSTRACT OF THE DISCLOSURE

As a new matter composition of, a cellular rubber based on 1,2-polybutadiene and a process for preparing same. A very valuable cellular rubber having a fine and uniform cellular structure can be obtained by a single vulcanizing and foaming step when polybutadiene containing a large number of 1,2-configuration units is used as the starting elastomer.

---

This invention relates to a cellular rubber based on polybutadiene abounding in 1,2-configuration units.

Cellular rubber has been made heretofore by vulcanizing and expending an unvulcanized elastomeric polymer, and the products thus obtained have been used for such purposes as a wide variety of cushioning and packing materials and the like. As the starting polymer, the 1,4-configuration polymer of conjugated diolefins such as natural rubber, 1,4-polyisoprene, styrene-butadiene rubber (SBR) and 1,4-polybutadiene have been used.

The conventional process of making these cellular rubbers consisted of a first step in which the unvulcanized polymer which has been blended with a vulcanizing agent, blowing agent and other additives such as a vulcanizing accelerator, blowing promoter, stabilizer, lubricant, fillers and processing oil, at 50–100° C. is heated for 5–15 minutes under the conditions of temperature 130–160° C. and pressure 50–150 kg./cm.$^2$, a second step in which the composition is then heated for 5–15 minutes under the conditions of temperature 155–170° C. and pressure 50–150 kg./cm.$^2$, and, if necessary, a further step consisting of a heat treatment at 150–170° C. Since the foregoing first step and second step are usually referred to in the art as "primary vulcanization" and "secondary vulcanization," respectively, and the condition applied to these steps are referred to as "vulcanizing conditions," these terms will be used herein and the appended claims.

The conventional cellular rubbers were usually of a cell structure which was non-uniform. For making these conventional cellular rubbers, it was not possible to obtain the desired product by means of the primary vulcanization step alone and it was always necessary to carry out both the primary and secondary vulcanization steps. Furthermore, as the period of time suitable for carrying out the primary vulcanization step was restricted to a very narrow range, the control of the operation had to be carried out with considerable preciseness.

It has now been found that an excellent cellular rubber could be prepared by using as the starting polymer a polybutadiene abounding in 1,2-configuration units. The polybutadiene abounding in 1,2-configuration units, as used herein, means those polybutadienes having in their molecule at least 50% of butadiene units of 1,2-configuration, as determined by the Morero method of infrared absorption spectrum analysis. As a result of a marked advancement in the technique of preparing 1,2-polybutadiene in recent years, it is now possible to prepare readily polybutadiene containing, say, above 90% of the 1,2-configuration units. However, since the properties of polybutadiene abounding in 1,2-configuration units are not sufficiently satisfactory for tires and other general purposes, it is not being widely used. The discovery that an excellent cellular rubber can be made from such a polymer material is a surprising fact, and it can be said that this discovery will contribute greatly to the development of new uses for this polymer.

The object of the present invention is to provide a cellular rubber based on the polybutadiene abounding in 1,2-configuration units as well as to a process for preparing same.

Features of especial significance according to the present invention are as follows:

(a) The invention product has uniform and fine cell structure and possesses not only a fine appearance but also the desirable mechanical properties that a cellular rubber should possess.

(b) In preparing the invention cellular rubber, the desired product can be obtained by just the single step vulcanization with no necessity of a secondary vulcanization step, which was indispensable in the case of the prior art. Further the period of time allowable for carrying out the single step vulcanization is long, thus making the control of the operation easy. As desired, the secondary vulcanization step may be carried out, although no particular advantages are had in this addition treatment. In addition to the foregoing features, the following advantages are had from the production standpoint when the polybutadiene abounding in 1,2-configuration units is used instead of the conventional starting polymers.

(c) The vulcanizing agent, blowing agent and other compouding agents can be blended with starting polymer readily and homogeneously in a short period of time.

(d) It is not necessarily required that resins for reinforcement or high grade reinforcing fillers such as white carbon (finely divided silica) be incorporated as in the case of the conventional cellular rubber, since products of sufficiently high degree of strength can be obtained without the incorporation of such reinforcing materials.

(e) The flow of the starting composition during vulcanization is good and the release of the product from the mold takes place readily. Hence, the rate of inferior articles being produced in operating on a commercial scale can be held to a minimum.

(f) The optional production of desired products is possible over a broad range of the expansion rate.

(g) Hard and soft cellular products can be made as desired in accordance with whether the degree of crystallinity of the starting polymer is high or low.

The polymer used as starting material in the present invention is a polybutadiene containing at least 50%, and preferably 70%, of the 1,2-configuration units. Polymers other than 1,2-polybutadiene can also be admixed in the starting material so long as they are used in a range as will not impair the intended effects. If the content of the 1,2-configuration units of the polybutadiene is less than 50%, the intended desirable product cannot be obtained.

The class of the vulcanizing agent, blowing agent and other additives that are to be blended with starting polymer and the amounts thereof as well as the vulcanizing conditions are similar to those used in the case of the preparation of the conventional cellular rubber, the choice being suitably made in accordance with the quality requirements of the intended product. However, as previously noted, the difference in the case of the present invention is that the time in which the primary vulcanization step may be carried out ranges over a longer period and the operation is simpler, as well as that fully satisfactory products are obtainable even though the secondary vulcanization and the subsequent heat treatment steps are omitted. The starting polybutadiene abounding in 1,2-configuration units will vary as to their degree of polymerization and degree of crystallinity depending upon the conditions of their preparation. When those whose degree of polymerization and degree of crystallinity are high are used as the starting material in the invention, hard cellular rubber is obtained.

The following examples are given to illustrate the invention more specifically. Unless otherwise specified, the parts and percentages are on a weight basis. The compounding recipes are also indicates on a weight basis. The percent content of the 1,2-configuration units in the polybutadiene used was determined by the Morero method of infrared absorption spectrum analysis, the degree of crystallinity was obtained by the density method, and the inherent viscosity ($\eta$) valve was obtained from a toluene solution at 30° C. in a customary manner.

On the other hand, the density of the cellular rubber product was measured in a customary manner, the tensile strength and elongation were determined in a customary manner by preparing No. 1 dumbbell specimens, and the hardness was measured with a Type C sponge rubber hardness meter.

EXAMPLE 1

Theree classes of 1,2-polybutadiene of differeing 1,2-units content (Runs 1, 2 and 3) and as control 1,4-polybutadiene of less than 50% of 1,2-units (Runs 4 and 5) were used, and cellular rubbers were made by preparing a mixture on 50–100° C. rolls in accordance with the compounding recipes shown in Table I and thereafter operating the vulcanization step under the conditions indicated therein. Cellular rubbers of fine and uniform cell structure were obtained from the polybutadiene of 83% 1,2-units (Run 1) and 73% 1,2-units (Run 2), while the polybutadiene of 54% 1,2-units (Run 3) yielded a cellular rubber which was for the most part satisfactory. On the other hand, in the case of the 1,4-polybutadiene of 30% 1,2-units (Run 4) and 2% 1,2-units (Run 5), the expansion being poor, a cellular rubber of satisfactory quantity was not obtained. The properties of resulting products are also shown in Table 1. As can be judged from the results, 1,2-polybutadiene yields good quality rubber by means of only the primary vulcanization step.

TABLE 1

| Run | 1 | 2 | 3 | 4 | 5 |
|---|---|---|---|---|---|
| Properties of polybutadiene: | | | | | |
| Degree of crystallinity (percent) | 0 | 0 | 0 | 0 | 0 |
| Inherent viscosity ($\eta$) | 2.3 | 2.5 | 2.4 | 2.7 | 3.0 |
| 1,2-configuration (percent) | 83 | 73 | 54 | 30 | 2 |
| Cis-1,4-configuration (percent) | 15 | 24 | 3 | 4 | 95 |
| Trans-1,4-configuration (percent) | 2 | 3 | 43 | 66 | 3 |
| Compounding recipes (parts): | | | | | |
| Polybutadiene | 100 | 100 | 100 | 100 | 100 |
| Process oil | 5.0 | 5.0 | 5.0 | 5.0 | 5.0 |
| ZnO No. 1 | 5.0 | 5.0. | 5.0 | 5.0 | 5.0 |
| Stearic acid | 1.0 | 1.0 | 1.0 | 1.0 | 1.0 |
| Activated $CaCO_3$ | 50.0 | 50.0 | 50.0 | 50.0 | 50.0 |
| Hard clay | 50.0 | 50.0 | 50.0 | 50.0 | 50.0 |
| Light $CaCO_3$ | 20.0 | 20.0 | 20.0 | 20.0 | 20.0 |
| $TiO_2$ | 10.0 | 10.0 | 10.0 | 10.0 | 10.0 |
| Blowing agent DPT[1] | 5.0 | 5.0 | 5.0 | 5.0 | 5.0 |
| Urea type blowing promoter | 5.0 | 5.0 | 5.0 | 5.0 | 5.0 |
| Accelerator MBTS[2] | 1.2 | 1.2 | 1.2 | 1.2 | 1.2 |
| Sulfur | 2.0 | 2.0 | 2.0 | 2.0 | 2.0 |
| Cumarone-indene resin | 5.0 | 5.0 | 5.0 | 5.0 | 5.0 |
| Diethylene glycol | 0.5 | 0.5 | 0.5 | 0.5 | 0.5 |
| Vulcanizing conditions: | | | | | |
| Temperature (° C.) | 140 | 140 | 140 | 140 | 140 |
| Pressure (kg./cm.²) | 70 | 70 | 70 | 70 | 70 |
| Time (min.) | 12 | 12 | 12 | 12 | 12 |
| Properties of cellular rubber: | | | | | |
| Density (g./cc.) | 0.324 | 0.341 | 0.398 | 0.569 | 0.677 |
| Tensile strength (kg./cm.²) | 13.8 | 13.1 | 12.6 | (3) | (3) |
| Elongation (percent) | 290 | 290 | 320 | (3) | (3) |
| Hardness (outside/inside) | 43/41 | 43/39 | 42/38 | (3) | (3) |

[1] DPT=Dinitroso pentamethylene tetramine.
[2] MBTS=Dibenzothiazyl disulfide.
[3] Expansion poor.

EXAMPLE 2

Four different classes of 1,2-polybutadienes differing in 1,2-units content, degree of crystallinity, and inherent viscosity were used and cellular rubbers were made in accordance with the same compounding recipes (Runs 6–9). The results obtained are shown in Table 2. Again, cellular rubbers were made using the same 1,2-polybutadienes but varying the compounds recipes (Runs 10–12). The results obtained in this case are shown in Table 3. In either case the vulcanization consisted of only the primary vulcanization step. The pressure used was 70 kg./cm.². The resulting vulcanized cellular rubbers were satisfactory in all case, the cell structure being fine and uniform.

TABLE 2

| Run | 6 | 7 | 8 | 9 |
|---|---|---|---|---|
| Properties of 1,2-polybutadiene: | | | | |
| 1,2-units (percent) | 83 | 88 | 89 | 90 |
| Degree of crystallinity (percent) | 0 | 15 | 15 | 25 |
| Inherent viscosity [$\eta$] | 2.05 | 1.75 | 2.43 | 1.75 |
| Compounding receipts (parts): | | | | |
| 1,2-polybutadiene | 100.0 | 100.0 | 100.0 | 100.0 |
| Process oil | 5.0 | 5.0 | 5.0 | 5.0 |
| ZnO No. 1 | 5.0 | 5.0 | 5.0 | 5.0 |
| Stearic acid | 1.0 | 1.0 | 1.0 | 1.0 |
| Activated $CaCO_3$ | 50.0 | 50.0 | 50.0 | 50.0 |
| Hard clay | 50.0 | 50.0 | 50.0 | 50.0 |
| Light $CaCO_3$ | 20.0 | 20.0 | 20.0 | 20.0 |
| $TiO_2$ | 10.0 | 10.0 | 10.0 | 10.0 |
| Blowing agent DPT | 5.0 | 5.0 | 5.0 | 5.0 |
| Urea type blowing promoter | 5.0 | 5.0 | 5.0 | 5.0 |
| Accelerator MBTS | 1.2 | 1.2 | 1.2 | 1.2 |
| Sulfur | 2.0 | 2.0 | 2.0 | 2.0 |
| Cumarone-indene resin | 5.0 | 5.0 | 5.0 | 5.0 |
| Diethylene glycol | 0.5 | 0.5 | 0.5 | 0.5 |
| Vulcanizing conditions: | | | | |
| Temperature (° C.) | 140 | 140 | 140 | 140 |
| Time (min.) | 12 | 10 | 10 | 10 |
| Properties of the cellular rubber: | | | | |
| Density (g./cc.) | 0.316 | 0.292 | 0.303 | 0.303 |
| Tensile strength (kg./cm.²) | 12.1 | 12.6 | 17.8 | 17.2 |
| Elongation (percent) | 290 | 160 | 200 | 140 |
| Hardness (outside/inside) | 44/40 | 51/46 | 48/45 | 63/57 |

TABLE 3

| Run | 10 | 11 | 12 |
|---|---|---|---|
| Compounding recipes (parts): | | | |
| 1,2-polybutadiene [a] | 100.0 | 100.0 | 100.0 |
| ZnO: | | | |
| No. 3 | | | 2.5 |
| No. 1 | 5.0 | 5.0 | |
| Accelerator mix: | | | |
| No. 1 [b] | 0.5 | | |
| No. 2 [c] | | 1.0 | 1.0 |
| Stearic acid | 2.5 | 3.0 | 3.0 |
| Blowing agent DPT | 5.0 | 5.0 | 5.0 |
| Urea type blowing promoter | 5.0 | 5.0 | 5.0 |
| Light $CaCO_3$ | | | 20.0 |
| Activated $CaCO_3$: | | | |
| CC | | 20 | |
| O | 15.0 | 40.0 | |
| Dixie clay | | | 40.0 |
| Age resister: | | | |
| IONOL [d] | | 2.5 | 2.5 |
| DAH [e] | 1.5 | | |
| Process oil | 15.0 | 15.0 | 20.0 |
| Diethylene glycol | | | 1.5 |
| Sulfur | 0.5 | 1.0 | 1.0 |
| $TiO_2$ | | 5.0 | |
| Vulcanizing conditions: | | | |
| Temperature (° C.) | 143 | 143 | 143 |
| Time (min.) | 8 | 8 | 8 |
| Properties of cellular rubber: | | | |
| Density (g./cc.) | 0.125 | 0.259 | 0.292 |
| Tensile strength (kg./cm.²) | 10.3 | 21.3 | 23.5 |
| Elongation (percent) | 190 | 210 | 210 |
| Hardness (outside/inside) | 43/40 | 57/53 | 60/56 |

[a] Properties of 1,2-polybutadiene:1,2-units content =91%.
[b] Mix No. 1=Blend of mercaptobenzothiazole and hexamethylene-tetramine.
[c] Mix No. 2=Blend of mercaptobenzothiazole, dibenzothiazyl disulfide and hexamethylene tetramine.
[d] IONOL=2, 6-di-tert.-butyl-p-cresol.
[e] DAH=2,5-di-tert.-amyl-hydroquinone.

EXAMPLE 3

The preparation of a cellular rubber was carried out in Run 13 in accordance with the compounding recipe indicated in Table 4, using a 1,2-polybutadiene of 92%, 1,2-units, a degree of crystallinity of 25% and ($\eta$) of 2.35 and by submitting the rubber composition to only the primary vulcanization step. As control, the preparation of a cullar rubber was carried out in Run 14 in accordance with the same compounding recipe but using styrene-butadiene rubber instead of 1,2-polybutadiene and by submitting the rubber composition to both the primary and secondary vulcanization steps.

The properties of the several resulting products are tabulated below.

The optimum period of time for the primary vulcanization of styrene-butadiene rubber being exceedingly short, the control of its expansion was difficult. Further, the cellular rubber of styrene-butadiene rubber obtained by only the primary vulcanization had a very non-uniform cell structure and it also lacked nerve. Hence, its merchandise value was very poor.

In contrast, the optimum period of time for carrying out the primary vulcanization of 1,2-butadiene is relatively long, thus permitting ready control of the expansion. Further, a cellular rubber of fine and uniform cell structure and having nerve can be obtained even when only the primary vulcanization step is performed. Accordingly, it can be seen that a satisfactory cellular rubber can be obtained from 1,2-polybutadiene even though only the primary vulcanization step is performed.

EXAMPLE 4

Runs 15 and 16, as indicated in Table 5, were carried out using two classes of 1,2-polybutadienes. In the foregoing runs two experiments were carried out for each run, the primary vulcanization conditions being varied in each case but with no change in the secondary vulcanization conditions. As control, Run 17 was carried out under substantially identical conditions using styrene-butadiene rubber. The results thus obtained are shown in Table 5.

In preparing the cellular rubber from 1,2-polybutadiene (Runs 15 and 16), the flow in the mold of the composition was better and the release of the product from the mold was also easier than the instance of styrene-butadiene rubber. Further, despite its generally lower density, the cellular rubber of 1,2-polybutadiene had a finer and more uniform cell structure than that of the cellular rubber of styrene-butadiene rubber and was very good in its appearance.

TABLE 5

| Run | 15 | | 16 | | 17 (Control) | |
|---|---|---|---|---|---|---|
| Properties of polybutadiene: | | | | | | |
|   1,2-units (percent) | 90 | | 92 | | | |
|   Degree of crystallinity (percent) | 25 | | 25 | | | |
|   Inherent viscosity ($\eta$) | 1.75 | | 2.35 | | | |
| Compounding recipes: | | | | | | |
|   JSR-1778 N [1] | | | | | 80.0 | |
|   JSR-0060 | | | | | 20.0 | |
|   1,2-polybutadiene | 80.0 | | 80.0 | | | |
|   Naphthenic process oil | 29.0 | | 29.0 | | 9.0 | |
|   ZnO No. 3 | 5.0 | | 5.0 | | 5.0 | |
|   Stearic acid | 2.0 | | 2.0 | | 2.0 | |
|   Vulcanization accelerator MBTS | 1.0 | | 1.0 | | 1.0 | |
|   Urea type blowing promoter | 5.0 | | 5.0 | | 6.0 | |
|   Activator (amine type) | 0.5 | | 0.5 | | 0.5 | |
|   Cumarone-indene resin | 5.0 | | 5.0 | | 5.0 | |
|   Diethylene glycol | 1.0 | | 1.0 | | 1.0 | |
|   White carbon | 30.0 | | 30.0 | | 30.0 | |
|   Hard clay | 60.0 | | 60.0 | | 60.0 | |
|   Light CaCO₃ | 50.0 | | 50.0 | | 50.0 | |
|   Blowing agent DPT | 5.5 | | 5.5 | | 5.5 | |
|   Sulfur | 2.0 | | 2.0 | | 2.0 | |
| Primary vulcanization conditions: | (a) | (b) | (a) | (b) | (a) | (b) |
|   Pressure (kg./cm.²) | 70 | 70 | 70 | 70 | 70 | 70 |
|   Temperature (° C.) | 145 | 145 | 145 | 145 | 145 | 145 |
|   Time (min.) | 9.0 | 11.0 | 9.0 | 11.0 | 6.5 | 7.0 |
| Secondary vulcanization condition: | | | | | | |
|   Pressure (kg./cm.²) | 70 | 70 | 70 | 70 | 70 | 70 |
|   Temperature (° C.) | 158 | 158 | 158 | 158 | 158 | 158 |
|   Time (min.) | 8 | 8 | 8 | 8 | 8 | 8 |
| Properties of cellular rubber: | | | | | | |
|   Density (g./cc.) | 0.185 | 0.212 | 0.240 | 0.307 | 0.262 | 0.334 |
|   Tensile strength (kg./cm.²) | 10.8 | 10.9 | 12.1 | 18.3 | 12.6 | 19.4 |
|   Elongation (percent) | 170 | 160 | 170 | 170 | 155 | 185 |
|   Hardness (outside/inside) | 47/44 | 49/47 | 52/59 | 55/54 | 45/41 | 40/40 |

[1] Oil extended styrene-butadiene rubber produced by the Japan Synthetic Rubber Company, Japan.

TABLE 4

| Run | 13 | 14 | |
|---|---|---|---|
| Compounding recipes: | | | |
|   JSR-1507 [1] | 80.0 | | |
|   JSR-0060 [2] | 20.0 | | |
|   1,2-polybutadiene | | 70.0 | |
|   Process oil | 35.0 | 5.0 | |
|   ZnO No. 1 | 5.0 | 5.0 | |
|   Stearic acid | 1.0 | 1.0 | |
|   Activated CaCO₃ | 50.0 | 50.0 | |
|   Hard clay | 50.0 | 50.0 | |
|   Light CaCO₃ | 20.0 | 20.0 | |
|   TiO₂ | 10.0 | 10.0 | |
|   Blowing agent DPT | 5.0 | 5.0 | |
|   Urea type blowing promoter | 5.0 | 5.0 | |
|   Accelerator MBTS | 1.2 | 1.2 | |
|   Sulfur | 2.0 | 2.0 | |
|   Cumarone-indene resin | 5.0 | 5.0 | |
|   Diethylene glycol | 0.5 | 0.5 | |
| | Primary | Primary | Secondary |
| Vulcanizing conditions: | | | |
|   Temperature (° C.) | 140 | 140 | 140 |
|   Time (min.) | 9 | 8 | 10 |
| Properties of cellular rubber: | | | |
|   Density (g./cc.) | 0.306 | 0.297 | 298 |
|   Tensile strength (kg./cm.²) | 12.9 | 11.4 | 14.0 |
|   Elongation (percent) | 180 | 340 | 200 |
|   Hardness (outside/inside) | 50/48 | 43/41 | 48/45 |

[1] JSR-1507=SBR produced by the Japan Synthetic Rubber Company, Japan.
[2] JSR-0060=High styrene SBR produced by the above company.

EXAMPLE 5

Three classes of 1,2-polybutadienes (Runs 18–20) were used and, after blending the components as in Example 1 in accordance with the compounding recipes indicated in Table 6, the primary and secondary vulcanization steps were carried out in accordance with the conditions indicated in the aforesaid table. The properties of the resulting cellular rubber are shown in said table. As control, Runs 21 and 22 were carried out in substantially identical manner using styrene-butadiene rubber. The results obtained are shown in Table 7.

1,2-polybutadiene was in all cases better than in the case of the styrene-butadiene rubber, the control experiments, in respect of the release of the product cellular rubber from the mold. The cellular rubber of 1,2-polybutadiene was also in all cases finer and more uniform in cell structure than the cellular rubber of styrene-butadiene rubber and was of finer appearance.

TABLE 6

| Run | 18 | | 19 | | 20 | |
|---|---|---|---|---|---|---|
| Properties of 1,2-polybutadiene: | | | | | | |
| 1,2-units (percent) | 81 | | 89 | | 90 | |
| Degree of crystallinity (percent) | 0 | | 15 | | 25 | |
| Inherent viscosity ($\eta$) | 2.37 | | 2.43 | | 1.75 | |
| Compounding recipes: | | | | | | |
| 1,2-polybutadiene | 90.0 | | 90.0 | | 90.0 | |
| Process oil | 15.0 | | 15.0 | | 15.0 | |
| ZnO No. 1 | 5.0 | | 5.0 | | 5.0 | |
| Stearic acid | 1.0 | | 1.0 | | 1.0 | |
| Activated $CaCO_3$ | 50.0 | | 50.0 | | 50.0 | |
| Hard clay | 50.0 | | 50.0 | | 50.0 | |
| Light $CaCO_3$ | 20.0 | | 20.0 | | 20.0 | |
| $TiO_2$ | 10.0 | | 10.0 | | 10.0 | |
| Blowing agent DPT | 5.0 | | 5.0 | | 5.0 | |
| Urea type blowing promoter | 5.0 | | 5.0 | | 5.0 | |
| Accelerator MBTS | 1.2 | | 1.2 | | 1.2 | |
| Sulfur | 2.0 | | 2.0 | | 2.0 | |
| Cumarone-indene resin | 5.0 | | 5.0 | | 5.0 | |
| Diethylene glycol | 0.5 | | 0.5 | | 0.15 | |
| | (a) | (b) | (a) | (b) | (a) | (b) |
| Primary vulcanization conditions: | | | | | | |
| Pressure (kg./cm.$^2$) | 70 | 70 | 70 | 70 | 70 | 70 |
| Temperature (° C.) | 140 | 140 | 140 | 140 | 140 | 140 |
| Time (min.) | 8 | 9 | 8 | 9 | 8 | 9 |
| Secondary vulcanization conditions: | | | | | | |
| Pressure (kg./cm.$^2$) | 70 | 70 | 70 | 70 | 70 | 70 |
| Temperature (° C.) | 160 | 160 | 160 | 160 | 160 | 160 |
| Time (min.) | 10 | 10 | 10 | 10 | 10 | 10 |
| Properties of cellular rubber: | | | | | | |
| Density (g./cc.) | 0.269 | 0.236 | 0.256 | 0.222 | 0.236 | 0.268 |
| Tensile strength (kg./cm.$^2$) | 8.5 | 7.8 | 13.6 | 10.2 | 12.2 | 16.7 |
| Elongation (percent) | 210 | 220 | 180 | 160 | 150 | 170 |
| Hardness (outside/inside) | 43/38 | 43/40 | 46/42 | 46/42 | 50/46 | 55/50 |

TABLE 7.—(CONTROLS)

| Run | 21 | | 22 | |
|---|---|---|---|---|
| Compounding recipes: | | | | |
| JSR-1507 | 80.0 | | 50.0 | |
| JSR-0060 | 20.0 | | 50.0 | |
| Nathphenic process oil | 5.0 | | 5.0 | |
| ZnO No. 1 | 5.0 | | 5.0 | |
| Stearic acid | 1.0 | | 1.0 | |
| Activated $CaCO_3$ | 50.0 | | 50.0 | |
| Hard clay | 50.0 | | 50.0 | |
| Light $CaCO_3$ | 20.0 | | 2.00 | |
| $TiO_2$ | 10.0 | | 10.0 | |
| Blowing agent DPT | 5.0 | | 5.3 | |
| Urea type blowing promoter | 5.0 | | 5.0 | |
| Accelerator MBTS | 1.2 | | 1.2 | |
| Sulfur | 2.0 | | 2.0 | |
| Cumarone-indene resin | 5.0 | | 5.0 | |
| Diethylene glycol | 0.5 | | 0.5 | |
| Primary vulcanization conditions: | (a) | (b) | (a) | (b) |
| Pressure (kg./cm.$^2$) | 70 | 70 | 70 | 70 |
| Temperature (° C.) | 140 | 140 | 140 | 140 |
| Time (min.) | 7.5 | 8.0 | 7.5 | 8.0 |
| Secondary vulcanization conditions: | | | | |
| Pressure (kg./cm.$^2$) | 70 | 70 | 70 | 70 |
| Temperature (° C.) | 160 | 160 | 160 | 160 |
| Time (min.) | 10 | 10 | 10 | 10 |
| Properties of cellular rubber: | | | | |
| Density (g./cc.) | 0.216 | 0.298 | 0.215 | 0.298 |
| Tensile strength (kg./cm.$^2$) | 8.6 | 14.0 | 8.6 | 14.7 |
| Elongation (percent) | 180 | 200 | 120 | 145 |
| Hardness (outside/inside) | 43/41 | 48/45 | 50/44 | 56/51 |

We claim:

1. In a process for preparing cellular rubber which comprises subjecting a mixture consisting essentially of an unvulcanized conjugated diolefin polymer, a blowing agent, a vulcanizing agent and one or more of vulcanizing accelerator, blowing promoter, stabilizer, lubricant, fillers and processing oil to expanding and vulcanizing conditions, the improvement wherein the conjugated diolefin polymer is a polybutadiene having at least 50% 1,2-configuration units and the expanding and vulcanizing is conducted in a single stage at a temperature of 130–160° C., a pressure of 50–150 kilograms per square centimeter and for a time period of 5–15 minutes.

2. The process according to claim 1 wherein said polybutadiene has at least 70% 1,2-configuration units.

References Cited

UNITED STATES PATENTS

| 2,763,897 | 9/1956 | Gates et al. | 260—2.5 H |
| 2,891,016 | 6/1959 | Kern et al. | 260—2.5 R |
| 3,232,920 | 2/1966 | Naylor | 260—79.5 B |
| 2,891,016 | 6/1959 | Kern et al. | 260—2.5 H |

FOREIGN PATENTS

| 1,487,322 | 7/1967 | France | 260—2.5 R |

SAMUEL H. BLECH, Primary Examiner

W. J. BRIGGS, Sr., Assistant Examiner

U.S. Cl. X.R.

260—23.7 M, 41.5 R, 79.5 B, 94.7 S, 94.7 R, 829